United States Patent [19]

Baer et al.

[11] Patent Number: 5,373,210
[45] Date of Patent: Dec. 13, 1994

[54] MOTOR BRUSH SPRING SUBASSEMBLY

[75] Inventors: Mark E. Baer, Linden; R. Lent Crevling, Jr.; Melvin E. Wolfe, both of Williamsport, all of Pa.

[73] Assignee: Shop Vac Corporation, Williamsport, Pa.

[21] Appl. No.: 27,028

[22] Filed: Mar. 5, 1993

[51] Int. Cl.$^5$ ............................................. H02K 13/00
[52] U.S. Cl. ......................... 310/247; 310/239; 310/242
[58] Field of Search .............. 310/239, 240, 242, 245, 310/247, 248, 249

[56] References Cited

U.S. PATENT DOCUMENTS

| | | | |
|---|---|---|---|
| 3,387,155 | 6/1968 | Krulls | 310/239 |
| 3,430,084 | 2/1969 | Hall et al. | 310/50 |
| 3,526,797 | 9/1970 | Jueschke | 310/245 |
| 3,590,299 | 6/1971 | Wiggs et al. | 310/248 |
| 3,656,016 | 4/1972 | Jacyno et al. | 310/50 |
| 3,968,391 | 7/1976 | Blank | 310/240 |
| 4,359,656 | 11/1982 | Fasterding et al. | 310/68 R |
| 4,409,508 | 10/1983 | Ooki et al. | 310/239 |
| 4,504,752 | 3/1985 | Iwaki et al. | 310/68 R |
| 4,554,476 | 11/1985 | Gotoh | 310/239 |
| 4,723,084 | 2/1988 | Reynolds | 310/247 |
| 4,800,312 | 1/1989 | Wacek et al. | 310/239 |
| 4,868,441 | 9/1989 | Bulick | 310/239 |
| 4,990,811 | 2/1991 | Nakata et al. | 310/239 |
| 5,256,925 | 10/1993 | Cutsforth | 310/247 |

Primary Examiner—R. Skudy
Attorney, Agent, or Firm—Marshall, O'Toole, Gerstein, Murray & Borun

[57] ABSTRACT

An electric motor brush subassembly includes a housing base, a housing cover, a brush, and a constant force spring. The brush is mounted between the housing base and the cover with the coil of the spring mounted adjacent to the outer end of the brush. The axis of the coil is disposed at a right angle with respect to the length of the brush and an unrolled spring segment extends along a side of the brush and is fixed in a slot in the cover. The spring exerts a force against the brush to bias the brush against the motor commutator.

6 Claims, 3 Drawing Sheets

MOTOR BRUSH SPRING SUBASSEMBLY

TECHNICAL FIELD

This invention relates generally to electric motors and more particularly to a subassembly for mounting the brushes of such a motor.

BACKGROUND ART

The motors in vacuum cleaners, hand-held power tools, and other small electrically-powered devices include brushes that engage a commutator on a central rotor.

Examples of designs for mounting the brushes of electric motors in general can be found in Nakata et al, U.S. Pat. No. 4,990,811; Bulick, U.S. Pat. No. 4,868,441; Gotoh, U.S. Pat. No. 4,554,476; and Iwaki et al, U.S. Pat. No. 4,504,752. Designs specifically for use in small electric motors can be found in Wacek et al, U.S. Pat. No. 4,800,312 and in Hall et al, U.S. Pat. No. 3,430,084.

It is common to use a helical compression spring to bias a brush against a commutator. The spring is mounted at an outer end of the brush with the axis of the spring aligned with the length of the brush. The spring extends as friction between the brush and the rotating commutator wears down the inner end of the brush, maintaining contact between the brush and the commutator.

One disadvantage of such designs results from the fact that the force of the spring decreases as the spring extends. This decrease in force causes the pressure between the commutator and the brush to continually decrease as the brush wears down. This eventually leads to poor contact between the brush and commutator, and poor motor performance.

There have been attempts to replace helical compression springs with coiled constant force springs (sometimes referred to as Hunter's springs) in order to obtain a constant force between the brush and the commutator throughout the life of the brush. Bulick and Nakata et al both use a spring assembly involving two coiled constant force springs mounted on opposite sides of a brush. A flat piece connects the ends of the two springs and presses against the rear of the brush.

One disadvantage of these designs appears to be increased cost and complexity of assembly.

SUMMARY OF THE INVENTION

The invention disclosed and claimed herein uses a single constant force spring to provide an easily assembled motor brush subassembly.

The subassembly includes a brush having a flat side extending between its inner end and outer end. The inner end has a concave curve adapted to engage the commutator. The brush is disposed for movement along its length within a housing. The subassembly also includes a constant force spring with a spring coil that is mounted in the housing so the spring coil is against the outer end of the brush. The coil axis is disposed substantially at a right angle with respect to the length of the brush. An unrolled spring section extends from adjacent the outer end of the brush to a slot on the housing. The slot is adjacent the side of the brush between the inner and outer ends. The brush is biased by the relatively constant tendency of the spring to roll up toward the slot.

The brush holder subassembly of this invention is easy to assemble. First, the brush is placed in a housing base and a tail section of the spring is fixed in the slot, which is on a housing cover. Then, the housing cover is placed over the base so the still fully-coiled spring is disposed adjacent the outer end of the brush. The cover is then moved inwardly toward the commutator. As this occurs, the tail section of the spring advances over the top side of the brush while the main body of the spring coil remains trapped against the outer end of the brush. The movement of the tail section causes a section of the spring to progressively unroll over the top side of the brush. The tail section is then secured at an inward position by securing the housing cover to the base at a desired location.

BRIEF DESCRIPTION OF THE DRAWINGS

Further advantages of the invention will become apparent upon reading the following detailed description in conjunction with the accompanying drawings, in which.

DESCRIPTION OF THE PREFERRED EMBODIMENTS

Figure 1:
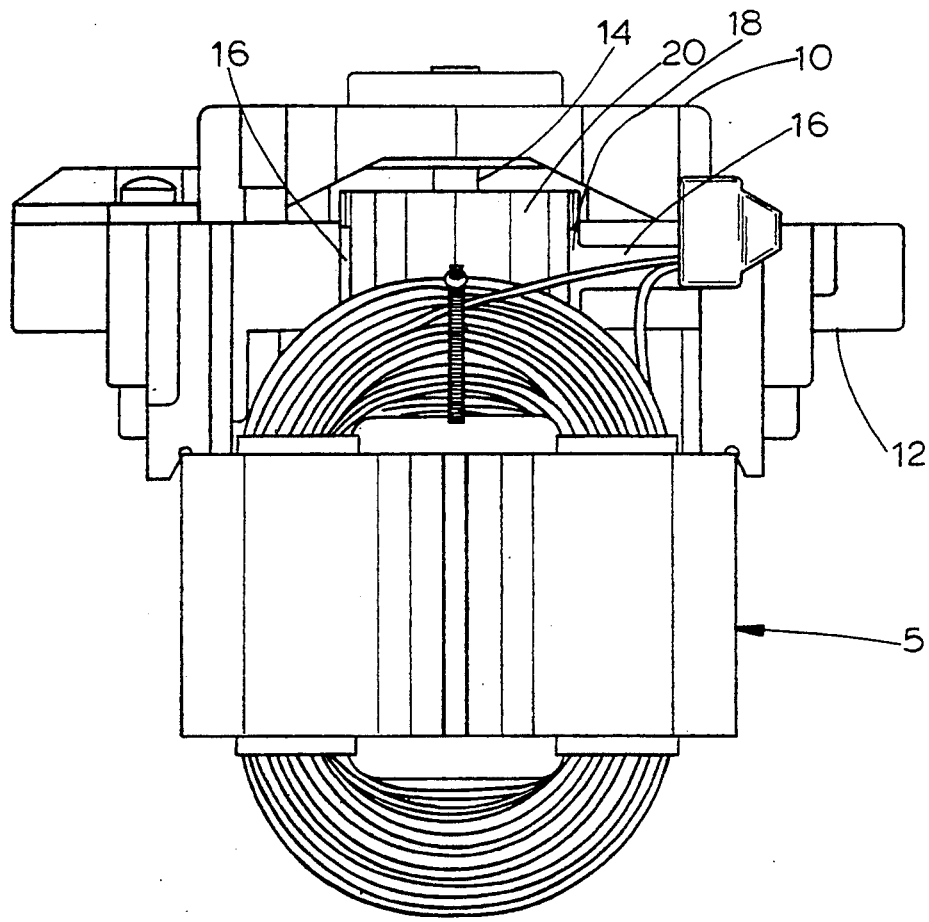
FIG. 1 is a side view of an electric motor with a motor brush spring subassembly in accordance with an embodiment of the present invention.

FIG. 1 shows an electric motor 5 with a brush holder subassembly 10 in accordance with an embodiment of the present invention. The subassembly 10 includes a housing base 12 around a motor shaft 14. Two identical brushes 16 are mounted in the subassembly 10 at diametrically opposed locations so that the inner end 18 of each brush will be biased radially inward against a commutator 20 on the motor shaft 14. As is well known in the art, the biasing is necessary to establish a current path between an external energizing circuit (not shown) and armature windings (not shown) on the motor shaft 14.

Figure 2:
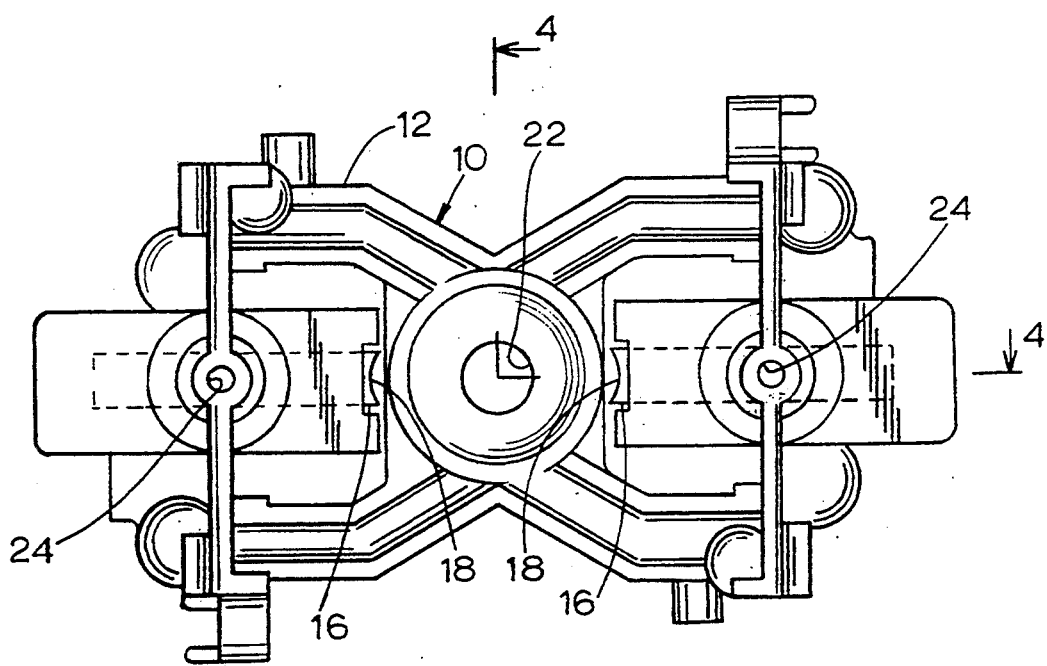
FIG. 2 is an elevational view of the bottom of the subassembly of FIG. 1.

As seen in FIG. 2, the housing base 12 has a central opening 22 that accommodates the motor shaft 14 (see in FIG. 1) and bolt openings 24 for fixing the subassembly to the rest of the motor 5 (also seen in FIG. 1).

Figure 3:
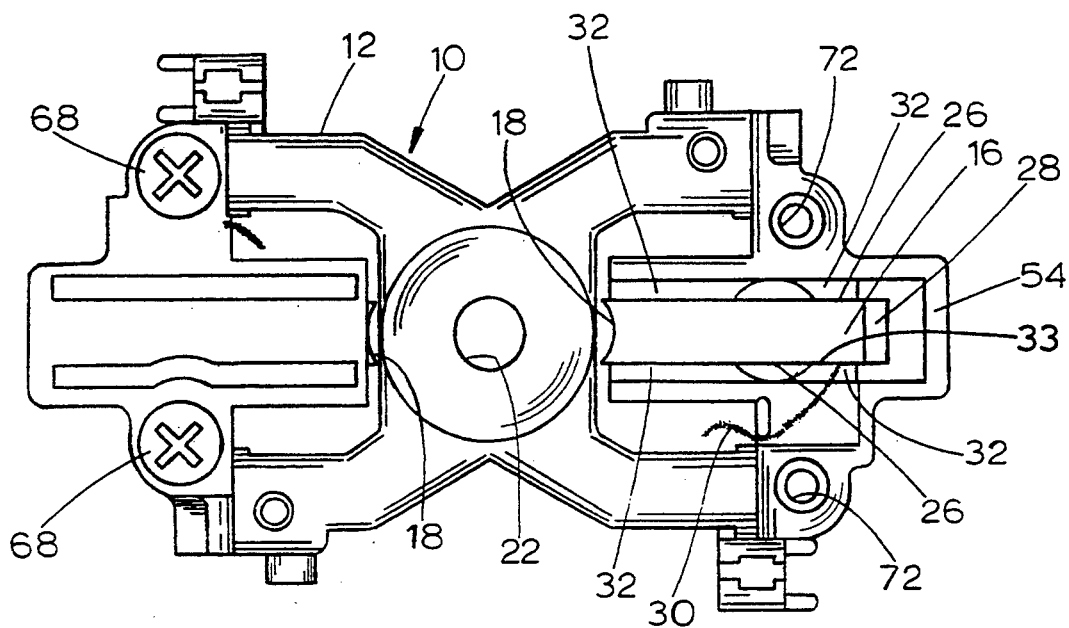
FIG. 3 is an elevational view of the top of the subassembly of FIG. 1, with one of the covers and springs removed.

As seen in FIG. 3, each brush 16 has flat sides 26 extending between a planar, inclined outer end 28 and the inner end 18. Each brush is approximately 4 cm long, 0.7 cm wide, and 1 cm high. Each brush is preferably made of carbon, as is well known in the art. Each brush is also electrically connected to the external energizing circuit through a pigtail 30.

Each brush 16 is mounted for movement along its length within the housing base 12. Movement is confined to a line directed toward the central opening 22 of the housing base 12 by side wall elements 32 of an open-sided channel 33. Movement is further confined by a housing cover 34, seen in FIG. 4, which is fastened over the open side of the channel. As seen in FIG. 5, the cover 34 has additional side wall elements 36.

In use, the inner end 18 of the brush 16 is worn down by friction caused by the revolving commutator 20. As the inner end 18 of the brush 16 wears down, continued contact of the inner end 18 with the commutator 20 is maintained by a coiled constant force spring 40. The spring 40 presses on the outer end 28 of the brush 16, advancing the brush toward the commutator 20.

The spring 40 used in the illustrated embodiment exerts a relatively constant force of approximately 0.75 pounds. Springs exerting higher or lower forces may also be useful, depending upon how much force is desired to be exerted on the commutator 20 by the brush 16.

Figure 4:
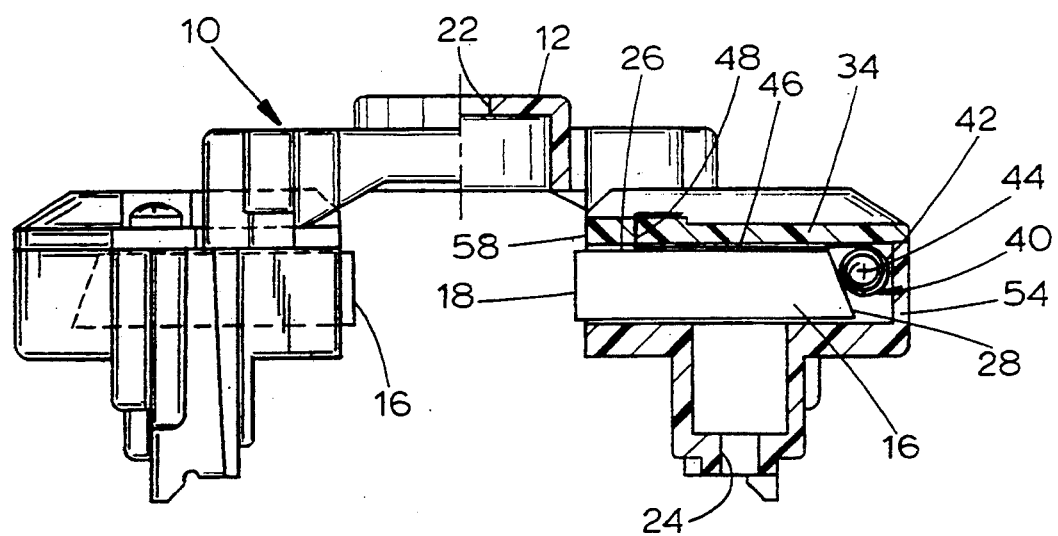
FIG. 4 is a sectional view of the subassembly taken generally along line 4—4 of FIG. 2.
Figure 5:
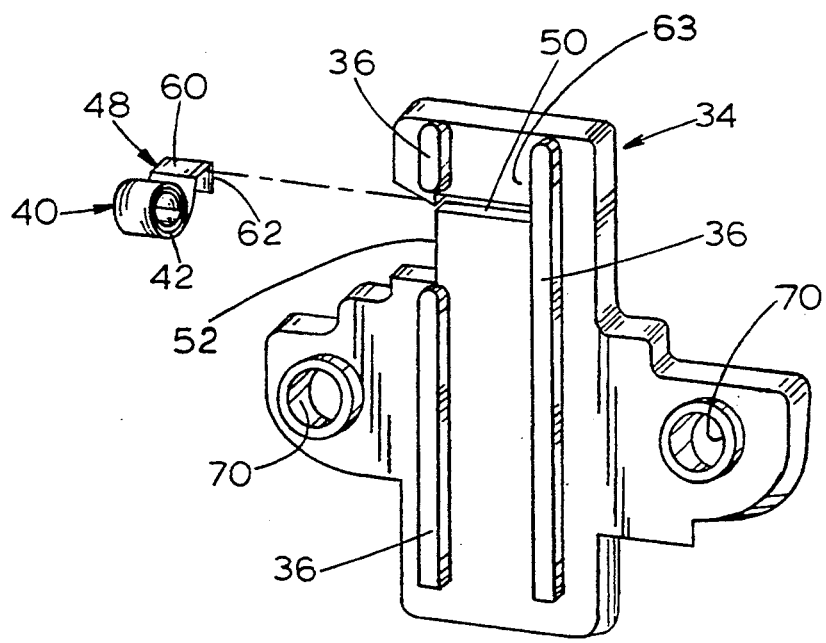
FIG. 5 is an orthogonal view of the bottom of one of the covers of the subassembly of FIG. 1.

As seen in FIG. 4, the spring 40 has three portions. A main coil 42 having a diameter of approximately 0.7 cm and a width of approximately 0.7 cm is disposed adjacent the outer end 28 of the brush. An axis 44 of the main coil 42 is disposed at a right angle with respect to the length of the brush 16. An uncoiled segment 46 of the spring 40 extends from the main coil 42 along the top side of the brush 16 to a tail end 48. As best seen in FIG. 5, the tail end 48 of the spring 40 is fixed to the cover 34 at a slot 50. The slot 50 extends from a lateral edge 52 through the cover 34 and, when the cover is fixed to the housing base 12, is perpendicular to the length of the brush 16. The spring 40 has an inherent tendency to roll up so that the main coil 42 rolls toward the tail end 48. This tendency is the source of the force that biases the brush 16 toward the commutator 20.

In order to be useful, the tail end 48 of the spring 40 must be fixed at a location that is radially closer to the inner end 18 of the brush 16 than is the main coil 42. In the embodiment seen in FIG. 4, the tail end 48 is fixed approximately 3 cm from the initial position of the axis 44 of the main coil 42. The radial distance between the main coil 42 and the fixed location of the tail end 48 determines the distance that the brush 16 can be moved toward the commutator 20 before the spring 40 ceases to exert its force on the outer end 28 of the brush.

The use of a constant force spring 40 results in a relatively constant force being applied to the brush 16 as the brush advances toward the commutator 20. The use of a constant force spring is believed to offer a significant advantage over conventional brush mounting designs that use a helical compression spring aligned with the length of the brush. With such conventional designs, the force exerted by the spring is believed to steadily decrease as the spring extends, in accordance with Hooke's law.

A brush assembly of the present invention offers another significant advantage over known brush mounting designs in ease of assembly. The assembly procedure involves a simple attachment of the housing cover 34 and the spring 40 to the housing base 12.

Figure 6:
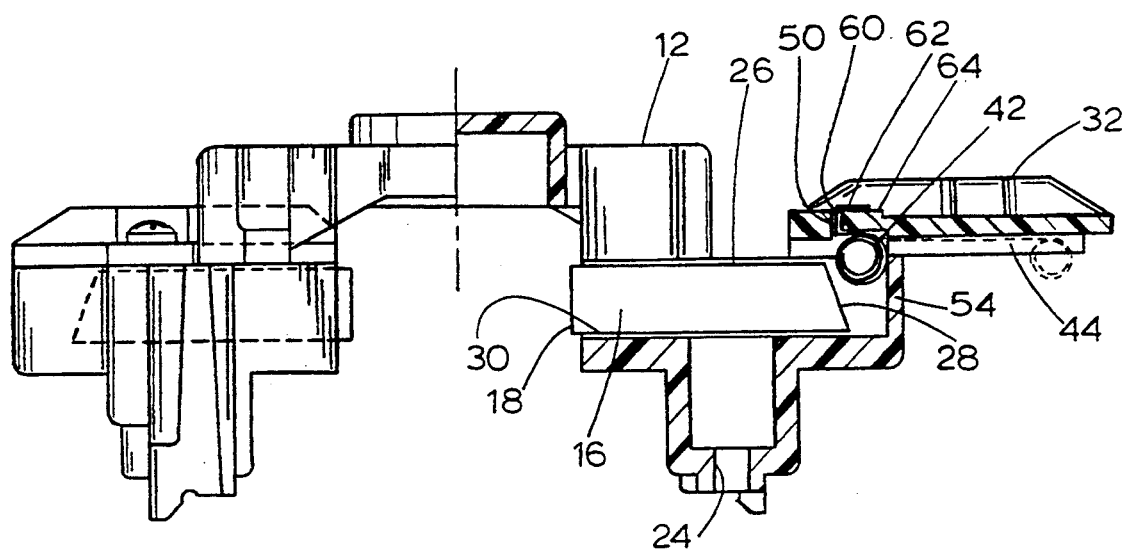
FIG. 6 is a sectional view of the subassembly similar to FIG. 4, with one of the covers and springs set in an initial position for assembly.

In the illustrated embodiment, the housing base 12 is first attached to the rest of the motor 5 by threading bolts, not shown, through the bolt openings 24, best seen in FIG. 6. Next, the housing base 12 is prepared for final assembly by inserting the brush 16 in the open sided channel (FIG. 3), between the side wall elements 32 in the housing base 12. The brush 16 is positioned with the inner end 18 facing inwardly and the outer end 28 sloping downwardly outward near a back wall 54 of the housing base 12. The pigtail 30, seen in FIG. 2, is connected to the external energizing circuit in any conventional manner, such as through the use of a connector, not shown.

The cover 34 and the spring 40 can be prepared for assembly as seen in FIG. 5. The projecting tail end 48 of the spring 40 has two sections: a first section 60 extending radially outwardly from the main coil and a second section 62 extending from and at right angles with respect to the distal end of the first section 60. The spring 40 is fixed to the cover 34 by a fit created by sliding the tail end 48 into the slot 50 such that the coil 42 is adjacent an inner surface 63 of the cover, the first section 60 of the tail end 48 fits in the slot 50, and the second section 62 overlies and abuts an outer surface 64 of the cover (FIG. 6). Of course, the spring 40 could be fixed to the cover 34 in another way, which could obviate the need for the slot 50 and result in a different configuration of the tail end 48 of the spring 40.

The housing base 12 and the cover 34 are assembled by first placing the cover 34 over the housing base 12 so that, as seen in FIG. 6, the main coil 42 of the spring 40 is disposed in a space between the outer end 28 of the brush 16 and the back wall 54. The cover 34 is then moved radially inwardly toward the inner end 18 of the brush 16. As the cover 34 is advanced over the brush 16, the main coil 42 of the spring 40 remains trapped behind the outer end 28 of the brush 16 while the tail end 48 fixed in the slot 50 advances over the top side 26 of the brush. As seen in FIG. 4, when the tail end 48 of the spring has been advanced to a desired location that is radially closer to the inner end 18 of the brush 16 than is the main coil 42, the cover 34 is secured in place. The cover 34 can be secured in any convenient way, such as by a pair of screws 68, seen in FIG. 3, which extend through aligned threaded bores 70 and 72 in the cover 34 (FIG. 5) and housing base 12 (FIG. 3), respectively.

While one or more embodiments of the invention have been illustrated and described in detail, it should be understood that modifications and variations of these embodiments may be effected without departing from the spirit of the invention and the scope of the following claims.

We claim:

1. A brush subassembly for an electric motor, comprising:
   a housing with an open-sided channel;
   a brush disposed in the channel and having a length extending between an inner end adapted to engage a commutator and an outer end;
   a separate cover fastened over an open side of the channel and having an inner surface adjacent the brush, an outer surface opposed to the inner surface, a lateral edge, and a slot extending from the lateral edge in a direction perpendicular to the length of the brush; and
   a spring having a coil mounted adjacent the outer end of the brush and exerting a spring force against the outer end of the brush, a coil axis parallel to the slot, an uncoiled segment extending between the coil and the slot on the cover, and a tail end with a first section extending perpendicularly from the uncoiled segment into the slot and a second section engaging the outer surface of the cover.

2. The brush subassembly of claim 1 wherein the inner end of the brush has a concave curve.

3. The brush subassembly of claim 1 wherein the spring is fixed to the cover by a fit of the tail end of the spring against the slot and the outer surface of the cover.

4. A brush subassembly for an electric motor, comprising:

a housing with an open-sided channel;

a separate cover fastened over an open side of the channel and having inner and outer opposed surfaces, a lateral edge, and a slot extending from the lateral edge;

a brush having a length extending perpendicularly to the slot between an inner end on one side of the slot and an outer end on another side of the slot, and being mounted for movement along that length within the channel; and a spring having a spring coil disposed adjacent the outer end of the brush, a coil axis parallel to the slot, an uncoiled segment extending from adjacent the outer end of the brush along the inner surface of the cover to the slot in the cover, a first tail end section extending into the slot, and a second tail end section extending from the slot along the outer surface of the cover.

5. The motor brush spring subassembly of claim 4 wherein the inner end of the brush has a concave surface adapted to contact a commutator.

6. The brush subassembly of claim 4 wherein the spring is fixed to the cover by a fit between the first and second tail end sections of the spring against the slot and the outer surface of the cover.

* * * * *